Feb. 21, 1956 K. F. GALLIMORE 2,735,975
MOTOR CONTROL SYSTEM FOR MACHINE TOOLS
Original Filed Sept. 16, 1947 4 Sheets-Sheet 4
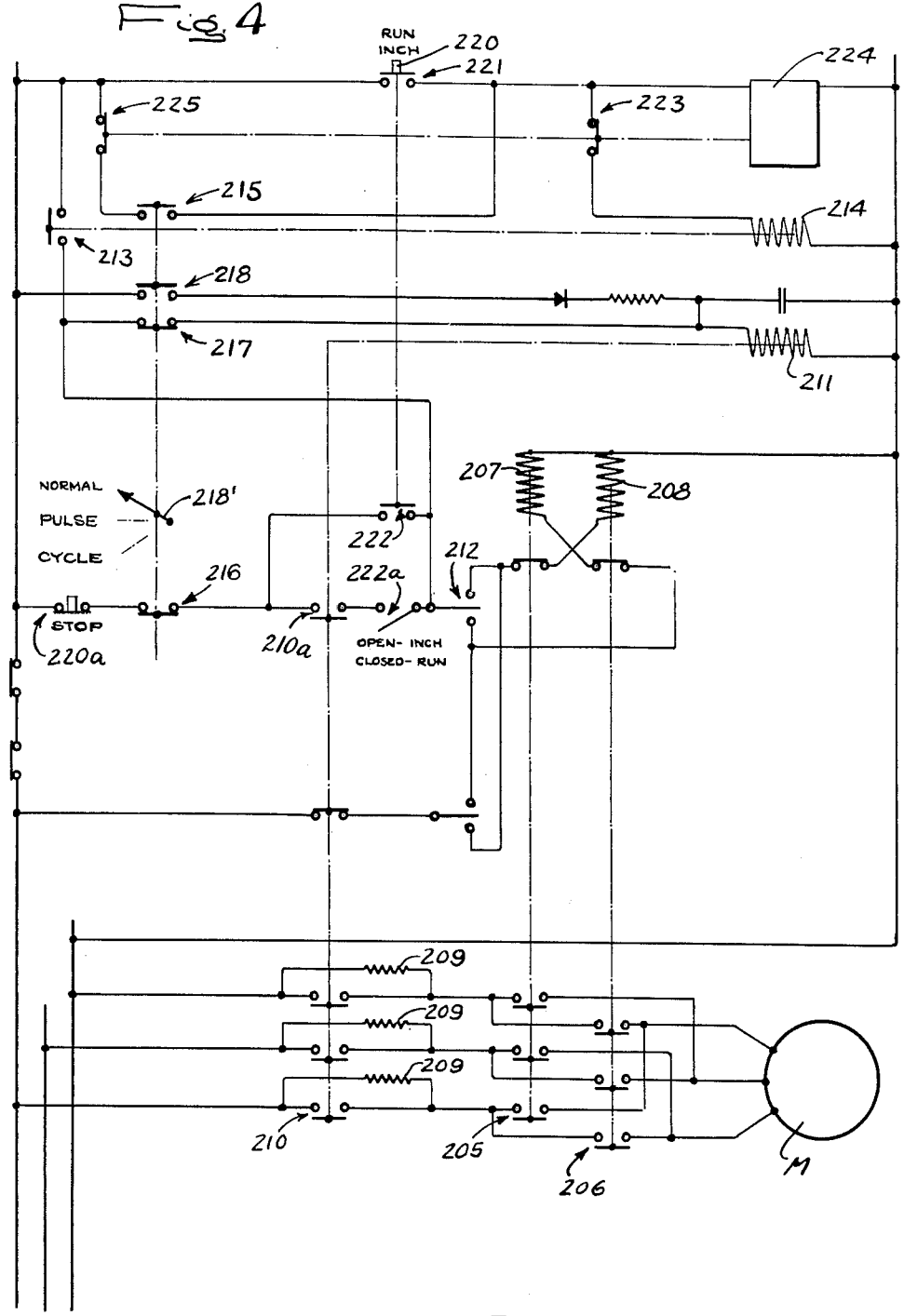
INVENTOR
Keith F. Gallimore
By Carlson, Pitzner, Hubbard & Wolfe
ATTORNEYS

United States Patent Office 2,735,975
Patented Feb. 21, 1956

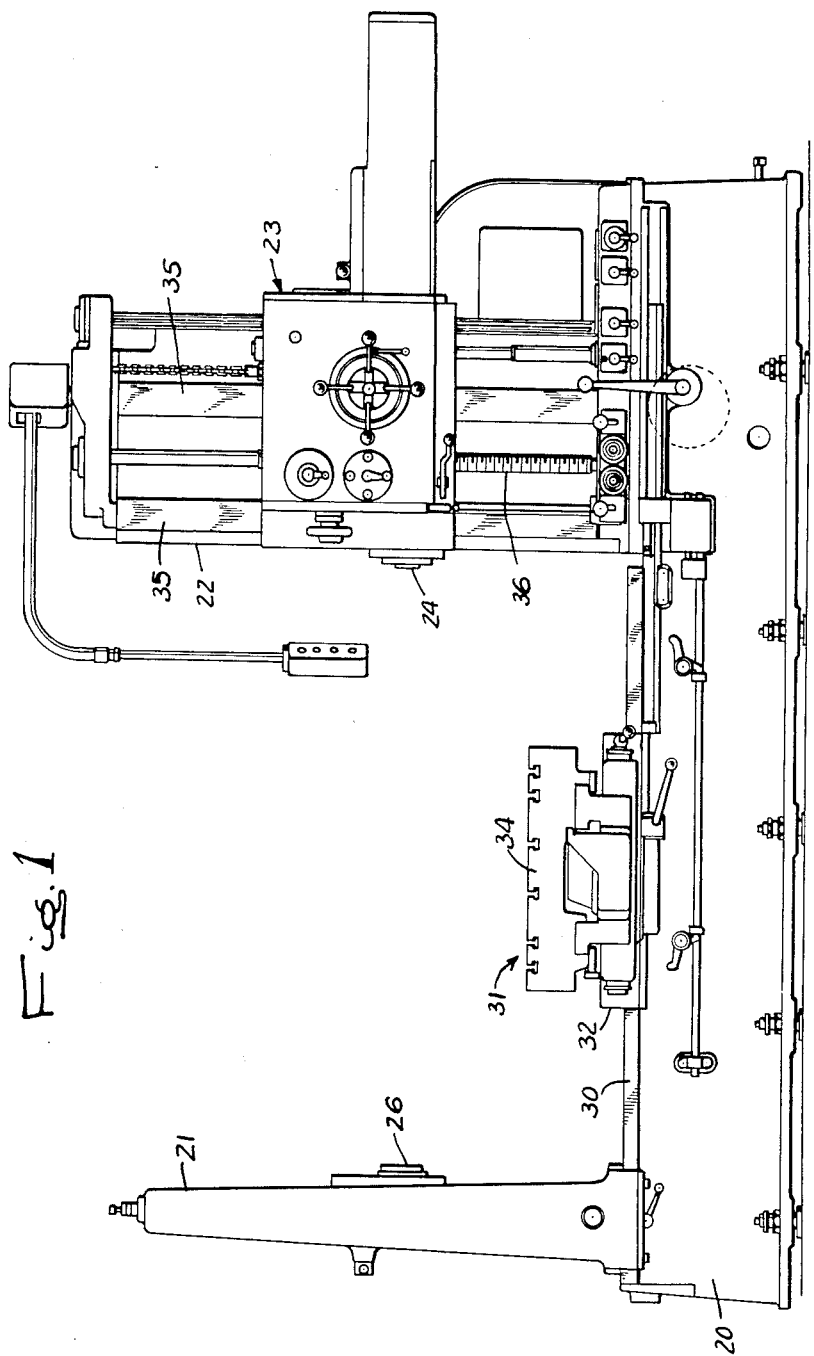

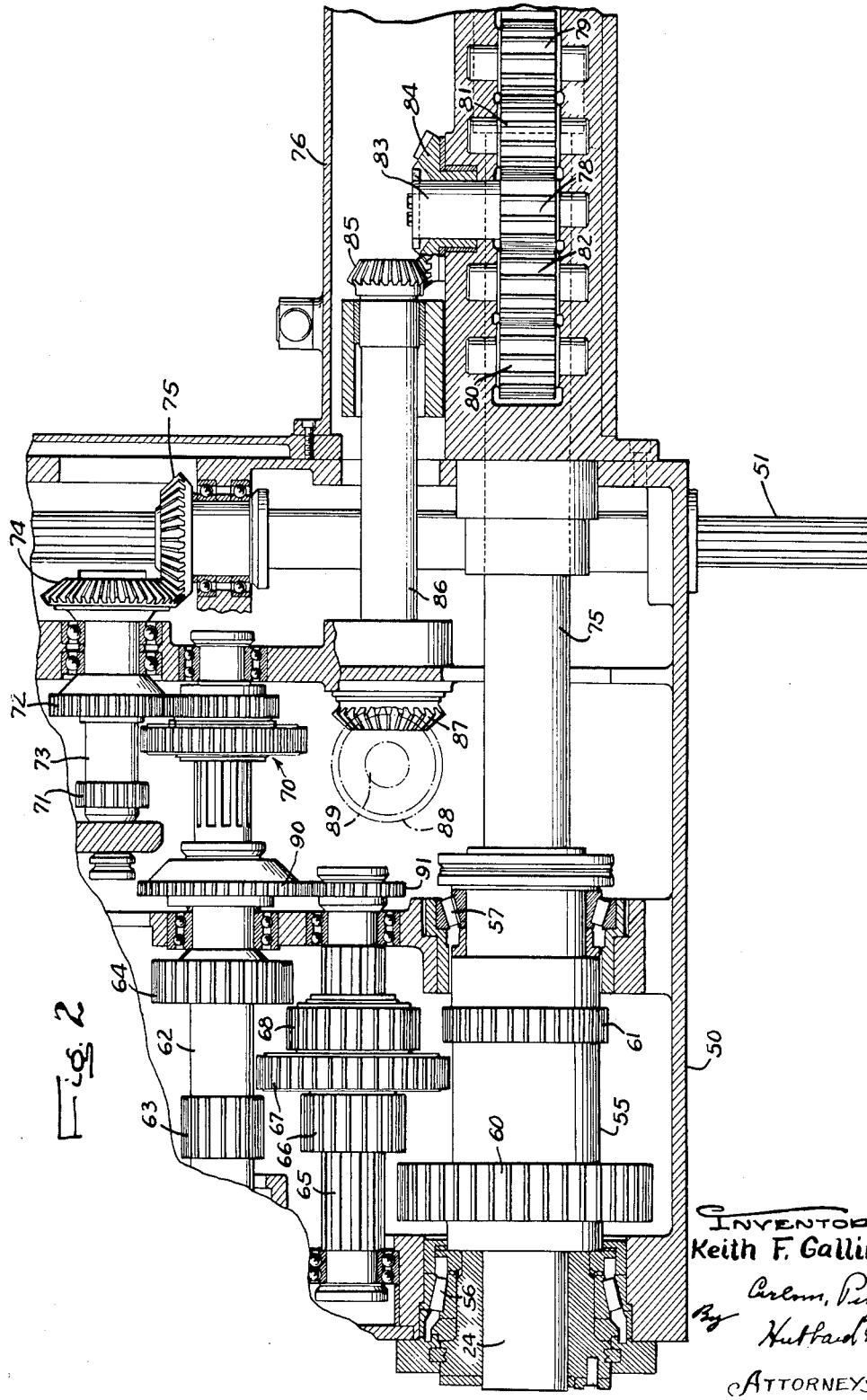

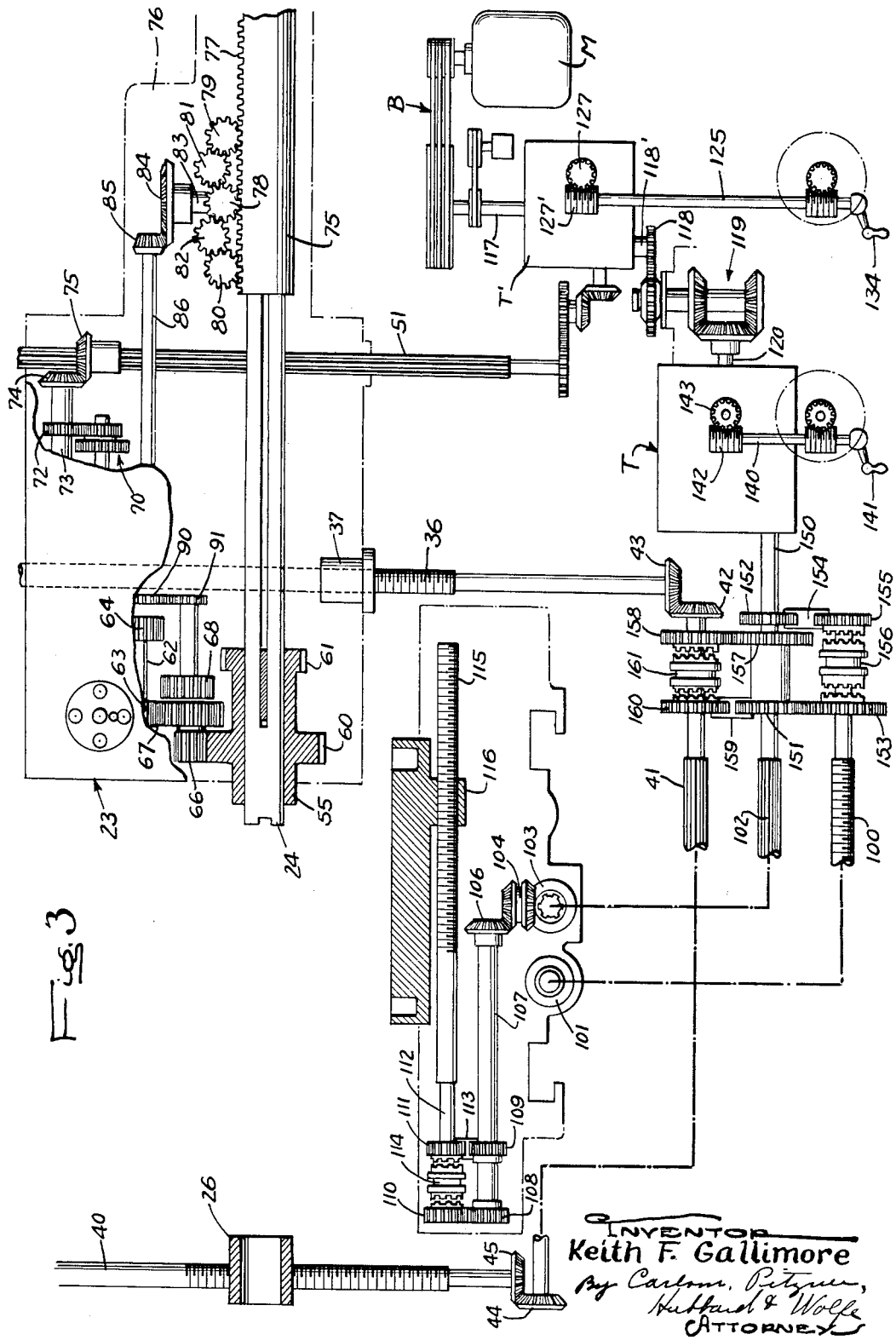

2,735,975

MOTOR CONTROL SYSTEM FOR MACHINE TOOLS

Keith F. Gallimore, Fond du Lac, Wis., assignor to Giddings & Lewis Machine Tool Company, Fond du Lac, Wis., a corporation of Wisconsin Application January 8, 1952, Serial No. 265,478

3 Claims. (Cl. 318—443)

The invention relates to machine tools and more particularly to improved controls for such machines.

This application is a division of my copending application Serial No. 774,308, filed September 16, 1947.

One object of the invention is to provide an improved control system which greatly facilitates the positioning of the movable elements of large heavy duty machine tools and enables such positioning to be effected quickly and with a very high degree of precision.

Another object is to provide a control system for machine tools of the above general character which enables the driving motor to be operated in a manner which facilitates the shifting of gears in the speed change devices incorporated in such machines.

A further object is to provide a control system which may be set selectively to place the driving motor of a machine under control of either a manually operable switch or a timing device or under joint control of both the switch and the timing device.

Other objects and advantages of the invention will become apparent from the following detailed description of the preferred embodiment illustrated in the accompanying drawings, in which:

Figure 1 is a front elevational view of a machine tool equipped with a control system embodying the features of the invention.

Fig. 2 is a fragmentary sectional view of the headstock of the machine taken in a vertical plane substantially on the axis of the tool spindle.

Fig. 3 is a diagrammatic layout of the drive and feed mechanisms of the machine.

Fig. 4 is a diagrammatic representation of the electrical control circuit of the machine.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring to the drawings, the machine selected to illustrate the invention is a horizontal boring, drilling and milling machine of more or less conventional type embodying certain novel features claimed in the parent application above referred to and in my copending application Serial No. 266,929 filed January 17, 1952. The machine illustrated comprises generally an elongated horizontal bed 20 having an end support or tailstock column 21 at one end and a headstock column 22 at the other end. The latter column supports a vertically adjustable headstock 23 equipped with a horizontally disposed, axially slidable and rotatable tool spindle 24.

The tailstock column 21 supports a vertically adjustable end block or tailstock 26 which cooperates in well known manner with the spindle 24 to support a boring bar (not shown) or similar elongated tool member. The column is adjustable longitudinally of the machine bed for the accommodation of boring bars of different lengths.

The machine bed 20 is provided on its upper face with horizontal ways 30 for adjustably supporting a carriage 31 upon which is mounted the work to be operated on. In the exemplary machine the carriage 31 comprises a saddle 32 slidable longitudinally of the machine bed on the ways 30. The saddle is also provided on its upper face with ways upon which a work supporting table 34 is mounted for movement transversely of the machine bed.

The headstock column 22 as herein shown comprises an upright hollow casting bolted or otherwise rigidly secured to the top of the machine bed 20 adjacent one end of the bed. The column is provided on its front face with spaced parallel vertical ways 35 supporting and guiding the headstock 23 for vertical adjustment. Such adjustment is effected through the medium of a feed screw 36 rotatably anchored at its upper end on the column and coacting with a fixed nut 37 (Fig. 3) carried by the headstock. At its lower end the feed screw is connected with driving mechanism including two multiple speed transmissions T and T', the latter of which also serves to drive and translate the spindle 24 as will appear presently. The driving mechanism and the transmissions in this instance are housed in the column end of the machine bed 20.

The tailstock 26 is adjusted vertically coincident with the adjustment of the headstock by means of a vertically disposed feed screw 40 (Fig. 3) rotatably supported in the tailstock column 21. To coordinate the movements of the headstock and tailstock the feed screws 36 and 40 are operatively connected as shown in Fig. 3 by a shaft 41 extending longitudinally of the machine bed. A bevel gear 42 fast on one end of the shaft 41 is in driving relation with a bevel gear 43 keyed to the lower end of the feed screw 36. The shaft 41 is splined to provide a slidable driving connection with a bevel gear 44 journaled in the base of the tailstock column 21 and in driving relation with a bevel gear 45 keyed to the lower end of the feed screw 40. The feed screws are thus rotated in unison to maintain the headstock and tailstock accurately alined in all positions of adjustment.

The headstock 23 may be of any preferred construction, that shown being of the general type disclosed in the Gallimore et al. Patent 2,400,819 issued May 21, 1946. Briefly, it comprises a hollow casing 50 (Fig. 2) which houses the spindle 24 and the gearing for driving and feeding the same. Power for the drive and feed is taken through the multiple speed transmission T' by way of a vertically disposed splined shaft 51 (Fig. 3) extending parallel to the ways 35 and the feed screw 36. This shaft is journaled at its upper end on the headstock column and is connected through suitable gearing with the transmission T'.

Referring more particularly to Figs. 2 and 3 of the drawings, the spindle 24 as herein shown extends through and is splined longitudinally in a sleeve member 55 rotatably supported in the casing 50 by anti-friction front and rear bearings 56 and 57. The spindle drive mechanism includes axially spaced gears 60 and 61 rigid with the sleeve 55. Journaled in the headstock casing 50 at one side of the spindle is a drive shaft 62 having gears 63 and 64 spaced apart axially of the shaft similar to the spacing of the gears 60 and 61. Located intermediate the shaft 62 and the spindle 24 and suitably journaled in the housing 50 is a splined shaft 65 upon which is slidably mounted for axial movement a cluster gear comprising gears 66, 67 and 68. By shifting this gear cluster to either side of its central or neutral position, driving connections having two different speed ranges may be established.

In the exemplary machine the drive shaft 62 is driven from the vertically splined shaft 51 through the medium of a two speed transmission including a cluster gear 70 splined at one end of the shaft 62 and cooperating alternately with a pair of gears 71, 72, carried by a countershaft 73. The countershaft is driven by means of a bevel gear 74 meshing with a bevel gear 75 journaled in the headstock casing 50 and having a splined driving connection with the shaft 51.

The mechanism for imparting axial feeding movements to the spindle 24 is also driven from the splined shaft 51. As shown in Figs. 2 and 9, the spindle is secured at its inner end to a ram 75 supported in axial alinement with the spindle by suitable guides provided in an auxiliary housing 76 bolted or otherwise rigidly secured to the rear face of the headstock casing 50. The ram is formed with rack teeth 77 engageable with a plurality of driving pinions journaled in the housing 76. Five such pinions are provided in the exemplary machine including a main driving pinion 78 and auxiliary driving pinions 79 and 80 spaced apart axially of the spindle and each positioned for coaction with the rack 77. Intermediate pinions 81 and 82 provide driving connections between the pinion 78 and the auxiliary pinions 79, 80.

As herein shown, the pinion 78 is mounted on a short shaft 83 having a bevel gear 84 meshing with a bevel gear 85 fast on a shaft 86 journaled in the casing 50. The latter is driven through bevel gears 87 and 88 from a shaft 89 constituting the driving shaft of a conventional transmission mounted in the headstock. This transmission is driven from a gear 90 rotatably mounted on the shaft 62 and meshing with a pinion 91 keyed to the spindle driving shaft 65.

Referring now to Fig. 3 of the drawings, it will be observed that the drive for the saddle and table feed mechanisms is also taken through the transmissions T and T'. Saddle feed is effected through the medium of a feed screw 100 coacting with a stationary nut 101 on the saddle. The drive for the table feed includes a splined shaft 102 extending longitudinally of the machine bed and having a slidable driving connection with a bevel gear 103 rotatably mounted on the saddle 32. The gear 103 meshes with one gear element of a double bevel gear 104, the other element of which coacts with a bevel gear 106 keyed to a drive shaft 107 extending longitudinally of the saddle. Gears 108 and 109 on the shaft 107 respectively drive gears 110 and 111 rotatably mounted on a shaft 112, the drive for the gear 111 including an intermediate gear 113 to effect reverse rotation of the gear 111 with respect to the gear 110. Either of the latter gears may be drivingly engaged with the shaft 112 selectively through the medium of a shiftable clutch member 114 having a splined connection with the shaft 112. The latter shaft is axially alined with and drivingly coupled to a feed screw 115 which coacts with a stationary nut 116 carried by the table.

Still referring to Fig. 3 of the drawings, the transmission T' is driven by an electric motor M through a V-belt drive B to a shaft 117 constituting the input shaft of the transmission. The transmission T, in turn, is driven from the transmission T' through a pickoff gear 118 on the output shaft 118' of the transmission T' and a one-way drive mechanism 119 associated with the input shaft 120 of the transmission T.

The transmissions T and T' may be of any suitable character and are preferably of the type in which the speed adjustments are effected by rotation of an adjusting or control element. The adjusting means for the transmission T' includes a shaft 125 having at one end a worm 127' engaging a worm wheel 127 on the transmission adjusting shaft. At its other end the shaft 125 is provided with operating means such as a hand crank 134 by which the shaft may be rotated manually.

The transmission T may be similar to the transmission T' and arranged for adjustment by a rotary shaft 140 having a hand crank 141 at its outer end and a worm 142 at its inner end driving a worm gear 143 fast on the transmission adjusting shaft. The transmission T has an output shaft 150 alined with and coupled to the spline shaft 102 for the table drive. The shaft 150 carries a pair of gears 151 and 152. Gear 151 meshes directly with a gear 153 rotatably mounted on an extension of the saddle feed screw 100 and gear 152 meshes with an idler gear 154 which, in turn, meshes with a gear 155 mounted on the feed screw extension. The gears 153 and 155 are accordingly rotated in opposite directions and may be coupled in driving engagement with the feed screw 100 selectively through the medium of a sliding clutch member 156 splined to the feed screw extension.

The shaft 150, as herein shown, carries a third gear 157 which meshes with a gear 158 rotatably mounted on an extension of the splined shaft 41 which drives the headstock and tailstock feed screws. The gear 151 previously referred to is connected through an intermediate gear 159 with a gear 160 rotatably mounted on the shaft extension in spaced relation to the gear 158. The gears 158 and 160 are accordingly rotated reversely and are adapted to be coupled selectively with the shaft 41 by means of a sliding clutch member 161 splined to the shaft extension.

In accordance with the invention, a novel control system is provided for the machine which greatly facilitates the positioning of the movable machine elements and also the changing of transmission gears, particularly the gears in the spindle drive.

Since in the exemplary machine power for the various drives is supplied by the motor M, the controls are associated with that motor and are arranged to provide for its operation for short, accurately controlled intervals to impart precise increments of movement to selected ones of the machine elements as determined by the setting of the various clutch mechanisms. Such intermittent, incremental operation is commonly known as "inching." The controls of the present invention afford three different types of "inching" operations, each of which finds particular utility in effecting one or more of the machine adjustments.

Referring to Fig. 4 of the drawings, it will be observed that the operating circuit for the motor M is controlled by a forward running switch 205 and a reverse running switch 206 actuated respectively by solenoids 207 and 208. Resistors 209 are normally connected in the motor circuit ahead of the running switches and are arranged to be shunted by the contacts of a switch 210 actuated by a solenoid 211. When the resistors are in circuit with the motor the latter runs at a reduced speed. The solenoids 207 and 208 for the running switches are adapted to be energized selectively under control of a two position switch 212 and a switch 213 actuated by a control relay 214. It will be appreciated that the two position switch 212 is preset manually or in any other preferred manner to determine the direction of rotation of the motor.

For determining the particular type of "inching" operation there is provided a three position selector switch having four sets of contacts 215, 216, 217 and 218.

In the first or Normal position of the switch, contacts 216 and 217 are closed and contacts 215 and 218 are open. In the second or Pulse position of the switch, all of the contacts are open. In the third or Cycle position of the switch, contacts 216 and 217 are open and contacts 215 and 218 are closed. These different switch positions may be visually indicated in any suitable manner as by an indicator finger 218' associated with the movable member of the selector switch.

The invention contemplates the use of a combined Run-Inch switch which may be of the well known commercial type having a push button 220 operable to close two sets of normally open switch contacts 221 and 222. Also forming a part of such conventional switches is a latch ring (not shown) by which a second set of switch contacts 222a are controlled. The arrangement is such that the latter switch contacts are closed when the latch ring is set in "run" position and open when the latch ring is set in "inching" position. With the switch 222a closed motor M may be started by a momentary closure of the switches 221, 222. Such closure completes energizing circuits for the relays 214 and 211 and for one or the other of the solenoids 207, 208. Energization of the relay 211 closes switch contacts 210 to shunt the resistors 209 from the motor circuit and also contacts 210a to complete a holding circuit for itself and the energized solenoid by way of the switch contacts 217, 222a, 210a, 216 and a normally closed stop switch 220a. The motor, therefore, continues in operation until the stop switch 220a is opened. This is the condition of the machine when running.

For initiating any of the "inching" operations, the switch 222a is opened to prevent establishment of the motor running circuit above described. The particular type of "inching" is then determined by setting the selector switch. Assume by way of illustration that this switch is set in the Normal position, actuation of the push button 220 closes switch contacts 222 to complete a circuit for one or the other of the solenoids 207 or 208, thereby initiating the operation of the motor M in the direction determined by the particular solenoid operated. Such operation of the motor continues as long as the push button 220 is actuated and the motor is stopped immediately upon release of the push button. It will be understood, of course, that the motor may be provided with a suitable brake or plugging device for effecting a quick stop.

Assume now that the selector switch is set in the Pulse position and that the switch 222a is open. Actuation of the push button 220 closes switch contacts 222 but this is without effect since switch contacts 216 are open. Switch contacts 221 are also closed to energize a control relay 214 and to initiate the operation of a timer 224. This timer may be of any preferred type adapted when operated to periodically open a normally closed switch 223 and a second normally closed switch 225. Control relay 214 initiates operation of the motor M by closing contacts 213 to energize one or the other of the solenoids 207 or 208. After a predetermined interval, the timer 224 opens a switch 223 to interrupt the circuit of the control relay 214 which becomes deenergized and opens switch contacts 213 to stop the motor. Thus on each actuation of the push button 220 the motor M is operated for a short predetermined interval and is then automatically stopped by the actuation of the timer. In this way, a predetermined small increment of movement may be imparted to any of the movable machine elements.

When the selector switch is set in the Cycle position, switch contacts 215 are closed to complete an operating circuit for the timer 224, which circuit is opened periodically by opening of the timer control switch 225. Moreover, the control relay 214 is energized in parallel with the timer by way of the switch contacts 223. Accordingly, the timer 224 and the control relay 214 operate periodically in regularly recurring cycles under control of the timer and in each such cycle the motor M is energized for a short period. The motor driven elements, of course, are "inched" or jogged periodically as long as the selector switch remains in the Cycle position. In this instance the circuit for the solenoid 211 is open at the switch contacts 217 of the selector switch, so that switch contacts 210 remain open and maintain the resistors 209 in the motor circuit to reduce current flow and thereby cause the motor to operate at low speed.

The Cycle type of inching above described is particularly advantageous in gear changing operations, since the various gears of the drive mechanisms receive incremental movements periodically to insure eventual proper meshing. Moreover, such inching may be used to effect a shifting of any selected machine element to a desired position in predetermined short steps. Such periodic operation may be interrupted by simply returning the selector switch to the Normal position.

It will be evident from the foregoing that the invention provides a control system of novel and advantageous character whereby the driving motor of a machine tool may be operated in a manner to facilitate the accurate positioning of the movable machine parts or the shifting of the gears of the drive mechanism. The improved controls provide for the selection of a variety of "inching" operations including the type of operation in which the motor is operated continuously at low speed as long as a manually operable starting switch is held in closed position. Alternatively, the controls may be set to provide a short running interval in response to each actuation of the starting switch or to provide successive operating intervals of precisely timed duration.

I claim as my invention:

1. In a machine tool having rotatable and translatable parts, in combination, an electric motor for driving said parts, a control circuit for said motor including a timer, a manually operable switch, and a multi-position selector switch connected in said control circuit and operable in one position to place said motor under control of said manually operable switch alone and in another position to place said motor under joint control of said manually operable switch and said timer.

2. In a machine tool having rotatable and translatable parts, in combination, an electric motor for driving said parts, a control circuit for said motor including a timer, a manually operable switch, and a multi-position selector switch having a plurality of sets of contacts so connected in said contorl circuit that in one position of said selector switch said motor is under control of said manually operable switch alone and in a second position of said selector switch said motor is under joint control of said manually operable switch and said timer, and in a third position of said selector switch said motor is under control of said timer alone.

3. In a machine tool having a rotatable spindle, an electric motor for driving the spindle, a control circuit for said motor including a normally open manually operable switch and a periodically operating timer, and a third position selector switch for regulating the action of said control circuit, said selector switch having switch contacts connected in the circuit and closed in one position of the selector switch to effect continuous energization of said motor as long as said manually operable switch is maintained closed, other contacts connected in the circuit and closed in another position of the selector switch operative to effect periodic energization of said motor under control of said timer as long as said manually operable switch is maintained closed, said contacts all being opened in a third position of said switch to effect the energization of said motor upon closure of said manually operable switch and to interrupt motor energization after a predetermined interval while the switch remains closed.

References Cited in the file of this patent

UNITED STATES PATENTS

| | | |
|---|---|---|
| 1,775,730 | McNicol | Sept. 16, 1930 |
| 2,053,143 | Frederick | Sept. 1, 1936 |
| 2,155,271 | Jones | Apr. 18, 1936 |
| 2,326,957 | Maguire | Aug. 17, 1943 |